United States Patent

[11] 3,557,869

| | | | |
|---|---|---|---|
| [72] | Inventors | Hans Weimann<br>Kriftel;<br>Alois Ruse, Stierstadt, Germany | |
| [21] | Appl. No. | 774,970 | |
| [22] | Filed | Nov. 12, 1968 | |
| [45] | Patented | Jan. 26, 1971 | |
| [73] | Assignee | Hartmann and Braun Aktiengesellschaft<br>Frankfurt am Main, Germany,<br>a corporation of Germany | |
| [32] | Priority | Nov. 15, 1967 | |
| [33] | | Germany | |
| [31] | | P1,648,930 | |

[54] CONDENSATE DRAINING DEVICE
5 Claims, 1 Drawing Fig.

[52] U.S. Cl. .................................................. 165/111,
62/281

[51] Int. Cl. .................................................. F28b 3/00
[50] Field of Search .......................................... 62/281,
283, 272, 188; 165/111; 55/30

[56] References Cited
UNITED STATES PATENTS
| | | | |
|---|---|---|---|
| 2,920,459 | 1/1960 | Ladusaw ...................... | 62/281 |
| 3,309,843 | 3/1967 | Rigopulos et al. ............ | 55/35 |

*Primary Examiner*—Charles Sukalo
*Attorney*—Franklin R. Jenkins

ABSTRACT: Device for removal of condensate from analysis gas ahead of an analyser wherein condensate forms when collected in the bottom of one container and migrates to the bottom of an adjacent container through a large number of capillary sized passageways, the adjacent container being provided with an overflow member at a height above the passageways.

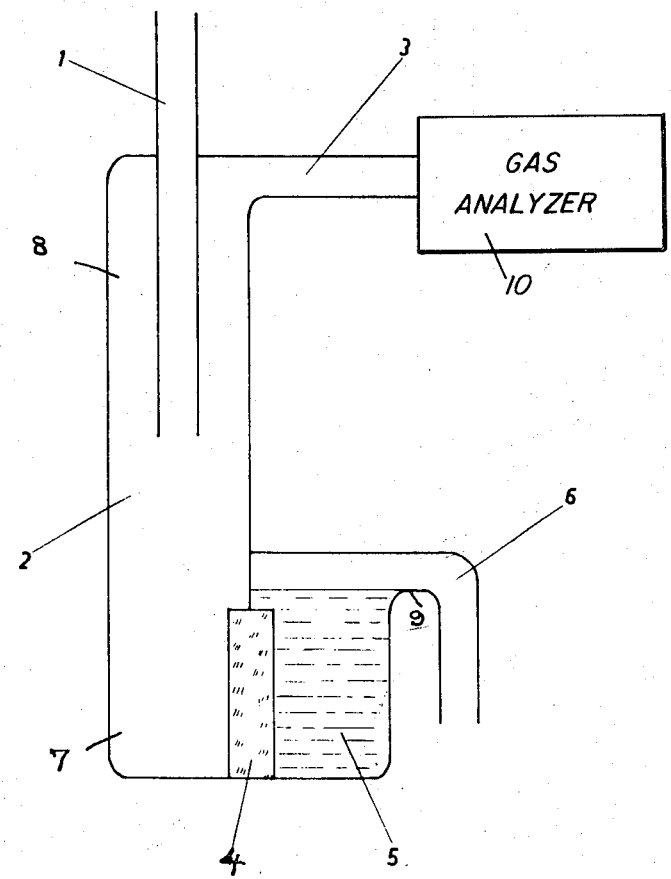

3,557,869

CONDENSATE DRAINING DEVICE

BACKGROUND OF THE INVENTION

1. Field of the Invention

Condensate syphon trap blocked by capillaries continually wetted by condensate.

2. Description of the Prior Art

In the automatic gas analysis of, for instance fuel gas, continuous or periodic samples are taken and led to an analyzer as analysis gas.

Disturbing or objectionable components in the feed or fuel gas such as dust, objectionable vapors, especially moisture or corrosive matter are removed by dust filters, analysis gas coolers, and absorption filters before the analysis gas reaches the analyzer. In order to remove especially the moisture from the analysis gas stream, the gas is led through an analysis gas cooler and cooled below the dew point. As a result, condensate is separated out from the analysis gas stream and caught in a collecting vessel. Since the collecting vessel has a limited holding capacity, additional devices must be provided in order that the condensate be allowed to drain or run out from the vessel. Such draining devices must however permit no ambient air to enter into the analysis gas stream, because the air would alter the composition of the analysis gas and cause a false indication by the analyzer, and hence, the devices must also operate as a sealant too, substantially impervious to gas.

There is a wide variety of such draining and sealing devices by which the condensate is removed from the collecting vessel, either periodically by hand or by means of float valves. The float valves are not reliable in closing. Under certain conditions the vessel can run dry and so the gas sealing effect of the device is lost. The result is, of course, that air enters into the analysis gas stream and causes the erroneous indications mentioned above.

It has been proposed to drain the condensate from the vessel continuously by means of a U-tube trap in order to maintain a gas seal and to reduce the number of mechanically operating parts. This has the drawbacks however in that, since the gas pressure in the collecting vessel varies from that of the atmosphere, it is necessary for the trap to have a certain minimum overall height dependent on the anticipated maximum pressure difference. In compact constructions the collecting vessel can be made smaller but additional space is still necessary for the trap.

The present invention overcomes these drawbacks in great measure by having the condensate runoff pass through capillary means wetted by the condensate.

SUMMARY OF THE INVENTION

The collecting vessel is provided with a capillary member at the bottom thereof to provide a passage of liquid from the vessel into the lower part of a leg of short inverted U-tube, the tube acting as a form of a dam. The capillary force exerted by the liquid on this member counterbalances the maximum anticipated difference between the pressure of the analysis gas in the vessel and that on the exterior side or face of the member.

As illustrated, an air scoop or overflow spout is additionally added for the condensate passing through the member to flow to a waste disposal and the impounded liquid constantly wets the passageways through the capillary member.

The capillary means is preferably of hydrophilic sintered material such as porous plate but a membrane permeable to liquid may be used.

BRIEF DESCRIPTION OF THE DRAWING

The drawing shows the invention schematically in vertical cross section.

DESCRIPTION OF THE PREFERRED EMBODIMENTS

A conduit 1 takes analysis gas, normally at a suitable superatmospheric pressure, from a source of the gas to be analyzed, the gas passing downwardly into a container 2 whose upper portion 8 is cooled by atmospheric air or by means (not shown) to bring the entering gas to a temperature below the dewpoint of the fluid to be separated out.

The upper portion 8 is provided with a gas outlet 3 through which the noncondensable gases pass on to an analyzer 10 for determining some component, such as oxygen for instance.

The lower part 7 of the container 2 serves as what is conventionally the receiving vessel that must have its contents removed.

The lower portion 7 of the container 2 adjoins the lower end 5 of an inverted U-tube and is provided with a porous plug plate at their bottom as a capillary means for passage or migration of liquid from the container into the leg 5, the latter preferably being of sufficient height to act as a dam 9 to permit a storage of liquid at least slightly above the level of the top edge of plate 4 before liquid can trickle over into the other leg 6 as a down spout.

The porous plug or porous plate member 4, being situated between the portion 7 and leg 5, is completely wetted by the condensate. As long as the difference between the pressure of the analysis gas and that of the atmosphere is less than the hydrostatic head of the condensate in leg 5, the condensate adjusts its level in the portion 7 corresponding to the pressure difference. If the difference in gas pressures exceeds this hydrostatic head i.e. when the pressure in the container is the greater, then all the liquid in portion 7 is forced out through the porous member into the leg 5 and, after filling the leg 5, the excess spills over the dam and passes off through overflow spout 6. This is the normal mode of operation. The maximum allowable pressure difference for the analysis gas relative to the atmosphere is dependent on the porosity of the capillary means, that is, of the porous plate. If this maximum value is exceeded, the analysis gas penetrates through the capillary means or member and the gas-sealing property of the latter is lost.

The porous plate is preferably of uniform porosity. While the properties of the plate may be varied by varying chemical composition of component materials as well as their particle size and manner of firing, ordinary laboratory plate has sufficiently fine voids to seal off, when wet, gas under many inches and more of water column with no danger of gas penetration.

A supported regenerated cellulose membrane, although slow in draining action, will seal against very, very much higher gas pressures. Supported blotting paper may be used if any harmful components are previously removed from the gas.

By having capillary means for the migration of the condensate outward from the lower portion of the vessel it is seen that the flow rate is not merely slowed, but as the vessel runs dry, the surface tension of the condensate enables the combination of condensate and porous plate plug to function essentially as a block, unless gas pressure within the vessel is quite high.

One reason why porous plate is especially desirable is that pores of the plate interconnect in random direction, so that with the porous plate plug being at the bottom of the vessel, the first few drops of water will wet the entire height of the plug. In similar manner, if the sampling system should operate later at a lower pressure, even subatmospheric, and condensate be drawn into the portion 7 from the leg 5, there will be less chance for the upper portion of the plug to dry out and allow air to enter the container 2.

We claim:

1. In a gas-analyzing system wherein liquid is condensed and separated from sample gas prior to analysis, a gastight container for serving as a condenser having a bottom portion as a collector for condensate, inlet means for conducting sample gas into the interior of the container, outlet means above the bottom portion for leading off gas substantially free from matter forming the condensate, and capillary means in the bottom portion for migration of condensate from the interior to the exterior of the bottom portion, the capillary means being wetted by the condensate and the capillary attraction between the capillary means and condensate being sufficiently strong to hold the condensate in the capillary means to seal the latter sufficiently to permit a difference in pressure between gas pressure within the container and pressure on the means exterior of the container, and a gas analyzer connected to the outlet means to receive the gas led off.

2. In a system as claimed in claim 1, and retaining means for retaining condensate that has migrated outwardly through the capillary means as free liquid at the capillary means and open to the atmosphere, the retaining means being for keeping the capillary means wetted with condensate.

3. In a system as claimed in claim 2, the retaining means being damming means, and an overflow spout.

4. In a system as claimed in claim 1, said capillary means being of sintered hydrophilic material.

5. In a system as claimed in claim 1, said capillary means being a liquid-permeable membrane.